L. T. SHERWOOD.
GLASS TANK FURNACE.
APPLICATION FILED JULY 31, 1916.

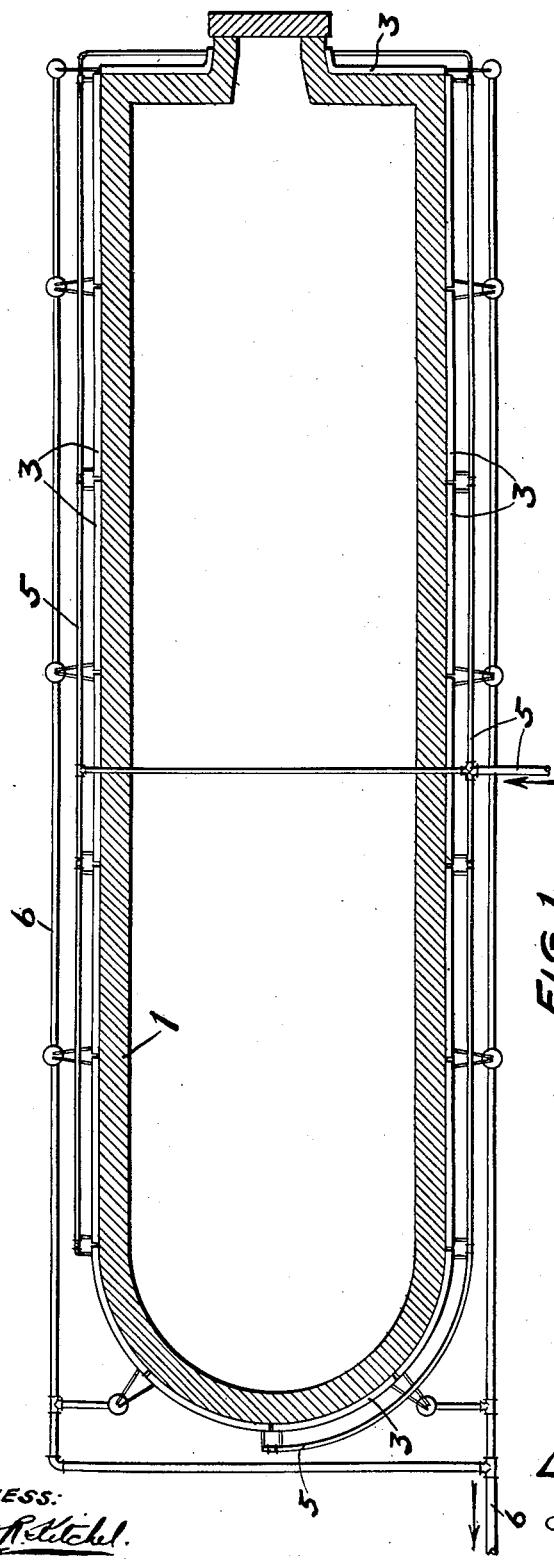
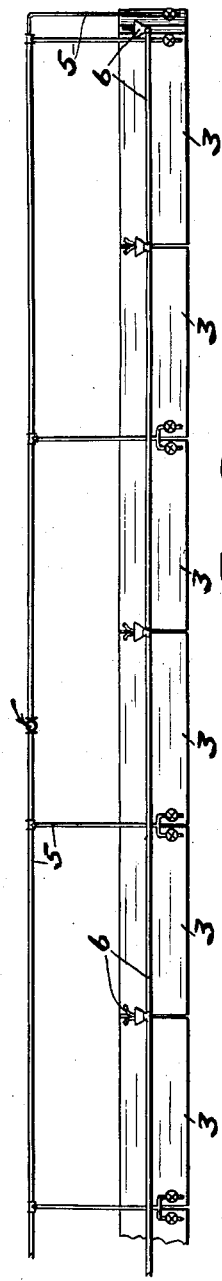

1,325,172.

Patented Dec. 16, 1919.
2 SHEETS—SHEET 2.

WITNESS:

INVENTOR
Laurence T. Sherwood
BY
Augustus B. Stoughton
ATTORNEY.

UNITED STATES PATENT OFFICE.

LAURENCE T. SHERWOOD, OF CONNELLSVILLE, PENNSYLVANIA, ASSIGNOR TO PENNSYLVANIA WIRE GLASS COMPANY, OF PHILADELPHIA, PENNSYLVANIA, A CORPORATION OF NEW JERSEY.

GLASS-TANK FURNACE.

1,325,172.      Specification of Letters Patent.      Patented Dec. 16, 1919.

Application filed July 31, 1916. Serial No. 112,213.

*To all whom it may concern:*

Be it known that I, LAURENCE T. SHERWOOD, a citizen of the United States, and a resident of Connellsville, in the county of Fayette and State of Pennsylvania, have invented certain new and useful Improvements in Glass-Tank Furnaces, of which the following is a specification.

The principal object of the present invention is to retain for glass tank furnaces all the well known advantages of walls and bottoms consisting of blocks of refractory material, while at the same time avoiding the previously existing disadvantageous features of such tank walls, which were that the blocks disintegrated or wore away and required frequent renewals. The invention consists in the improvements to be presently described and finally claimed.

The accompanying drawings form part hereof and in them—

Figure 1, is a top or plan view, partly in section.

Fig. 2, is a side elevational view.

Figure 3:
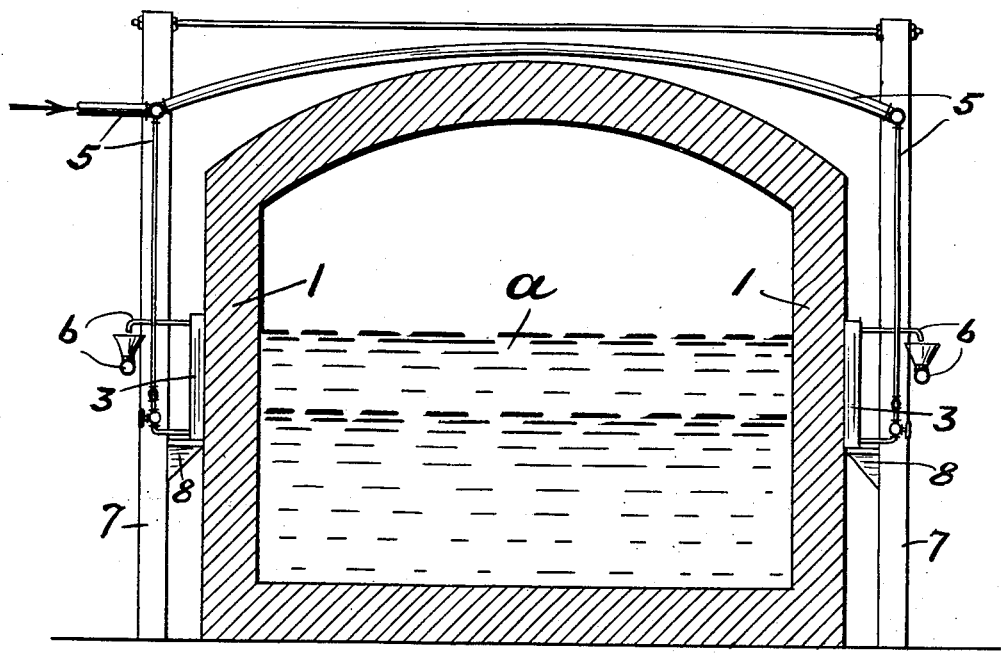
Fig. 3, is a cross-section, somewhat diagrammatic, and drawn to an enlarged scale
Figure 4:
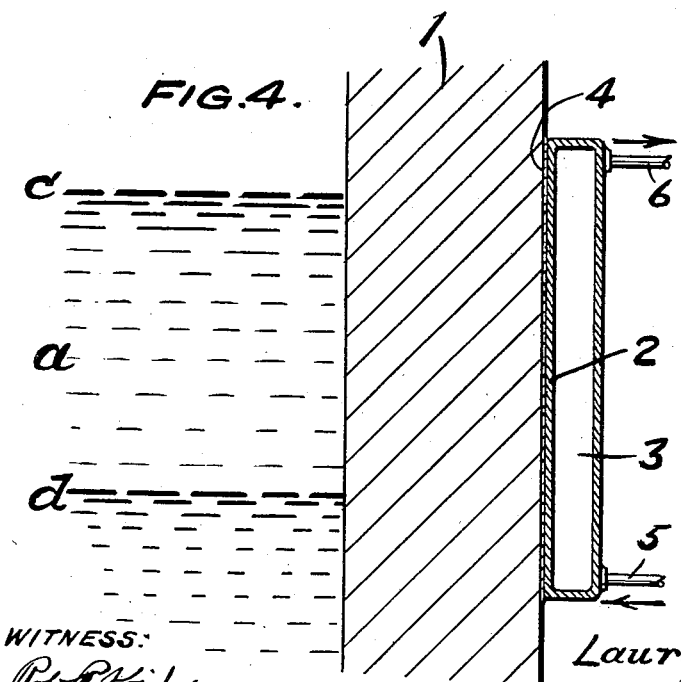
Fig. 4, is a transverse sectional view, drawn to a larger scale.

In the drawings 1, is the refractory wall of a glass tank furnace and it consists of blocks of refractory material. One face of this refractory wall is exposed to the molten glass *a*. Water cooled retaining plates 2, as of metal, are applied to the other face of the refractory wall 1. They serve to keep the temperature of the adjacent blocks, constituting the refractory wall, sufficiently low to oppose and arrest, if not entirely prevent, erosion, wearing away or disintegration at the portions of the refractory wall which are exposed to the melted glass. Whatever the action may be the fact is that the refractory walls last much longer and withstand the action of the molten glass much better than heretofore. The plates or walls 2, also afford support for the refractory walls. 4 is a luting or packing which may be provided between the confronting surface of the refractory wall and the plates 2, in order to promote conduction of heat from the molten glass to the water and in order to fill any spaces or hollows due to irregularities in the outer face presented by the blocks. As shown the plates 2 are arranged practically all around the glass tank furnace and extended above and below the high and low levels *c* and *d*. One way of applying water to the plates 2 is to make them a part of water boxes which may be inclosed, as shown in Figs. 1 to 4.

Referring to Figs. 1 to 4, 5 are supply pipe connections comprising a manifold and its valved branches on each side of the tank. These connections 5, serve to supply water to the boxes 3, under sufficient head to maintain a circulation and overflow through the drain connections 6, which include gaps and funnels that afford means for ascertaining that the circulation is properly maintained. 7, are buck-stays which afford suitable means for supporting brackets 8, that carry and hold the water boxes up to their work. It will be obvious that the refractory wall 1, and water cooled wall 2, are intended to separate the water or other cooling medium and the molten glass *a*.

What I claim is:

In a glass tank furnace the combination of a side wall consisting of blocks of refractory material and having a substantially flat vertical exterior surface, water boxes arranged wholly exteriorly of said vertical surface of the wall each having one of their substantially flat water retaining plates facially applied to said flat exterior surface, said plates being arranged immediately adjacent to each other and substantially continuous in their application to the surface and extending above and below the glass level in the tank, and independent water connections for each box.

LAURENCE T. SHERWOOD.